United States Patent
Chiba et al.

(10) Patent No.: US 10,773,577 B2
(45) Date of Patent: Sep. 15, 2020

(54) VEHICLE REAR DOOR MADE OF RESIN

(71) Applicants: TOYOTA JIDOSHA KABUSHIKI KAISHA, Toyota-shi, Aichi-ken (JP); TOYOTA JIDOSHA KYUSHU KABUSHIKI KAISHA, Miyawaka-shi, Fukuoka-ken (JP)

(72) Inventors: Kenji Chiba, Tokai (JP); Takayuki Okubo, Toyota (JP); Kiyokazu Nitta, Miyoshi (JP)

(73) Assignees: TOYOTA JIDOSHA KABUSHIKI KAISHA, Toyota (JP); TOYOTA JIDOSHA KYUSHU KABUSHIKI KAISHA, Miyawaka (JP)

( * ) Notice: Subject to any disclaimer, the term of this patent is extended or adjusted under 35 U.S.C. 154(b) by 0 days.

(21) Appl. No.: 16/244,407

(22) Filed: Jan. 10, 2019

(65) Prior Publication Data

US 2019/0217690 A1 Jul. 18, 2019

(30) Foreign Application Priority Data

Jan. 17, 2018 (JP) .................................. 2018-005779

(51) Int. Cl.
*B60J 5/10* (2006.01)
*B60R 13/02* (2006.01)

(52) U.S. Cl.
CPC ............... *B60J 5/107* (2013.01); *B60J 5/101* (2013.01); *B60R 13/0243* (2013.01)

(58) Field of Classification Search
CPC ..... B60J 5/10; B60J 5/101; B60J 5/102; B60J 5/107; E05Y 2900/532; E05Y 2900/546; B60R 13/0243

USPC ....................................... 296/146.7–146.9, 56
See application file for complete search history.

(56) References Cited

U.S. PATENT DOCUMENTS

| | | | | |
|---|---|---|---|---|
| 4,822,098 A | * | 4/1989 | Vogt ......................... | B60J 5/101 296/146.5 |
| 6,286,889 B1 | * | 9/2001 | Kim ....................... | B60R 13/011 296/146.7 |
| 2010/0019522 A1 | * | 1/2010 | Nakamura ............... | B60J 5/107 296/50 |
| 2011/0179719 A1 | * | 7/2011 | Matsumoto ................ | B60J 5/10 49/502 |
| 2011/0215612 A1 | * | 9/2011 | Maertin ............. | B60R 13/0243 296/146.7 |
| 2013/0280452 A1 | * | 10/2013 | Nawroth ................... | B32B 3/30 428/35.7 |

(Continued)

FOREIGN PATENT DOCUMENTS

| | | |
|---|---|---|
| JP | 2011-126388 A | 6/2011 |
| JP | 2015-101160 A | 6/2015 |

*Primary Examiner* — Gregory A Blankenship
(74) *Attorney, Agent, or Firm* — Oliff PLC

(57) ABSTRACT

A vehicle rear door made of resin includes an inner panel having a rear window opening, a lower outer panel including an edge portion which is secured to the inner panel along a periphery portion of the rear window opening, a rear window glass attached to the edge portion of the lower outer panel on an exterior side of a passenger compartment, and an interior trim attached to the interior panel on an interior side of the passenger compartment. An edge portion of the interior trim is secured to a rib of the inner panel disposed at a front edge of the inner panel along the peripheral portion of the rear window opening.

2 Claims, 3 Drawing Sheets

(56) References Cited

U.S. PATENT DOCUMENTS

| | | | |
|---|---|---|---|
| 2016/0236723 A1* | 8/2016 | Ikeda | B32B 3/08 |
| 2016/0263973 A1 | 9/2016 | Kawashima et al. | |
| 2016/0375747 A1* | 12/2016 | Kawashima | B60J 5/101 |
| | | | 49/475.1 |
| 2018/0056763 A1* | 3/2018 | Motohashi | B60J 5/107 |
| 2019/0184797 A1* | 6/2019 | Chiba | B60J 5/107 |
| 2019/0193524 A1* | 6/2019 | Stoltz | H02K 7/006 |
| 2019/0193535 A1* | 6/2019 | Chiba | B60J 5/107 |
| 2019/0217690 A1* | 7/2019 | Chiba | B60J 5/101 |

* cited by examiner

VEHICLE REAR DOOR MADE OF RESIN

CROSS REFERENCE TO RELATED APPLICATION

This application claims priority to Japanese Patent Application No. 2018-005779 filed on Jan. 17, 2018, which is incorporated herein by reference in its entirety including the specification, claims, drawings, and abstract.

TECHNICAL FIELD

The present disclosure relates to a vehicle rear door made of resin.

BACKGROUND

In recent years, vehicle doors made of resin have become widely used. For example, a resin rear door is proposed in which an edge portion of a resin outer panel is attached to a resin inner panel with adhesive along a periphery portion of a rear window opening and a rear window glass is attached along the edge portion of the outer panel on an exterior side of the vehicle compartment (for example, JP 2011-126388A).

An interior trim may be attached on a rear door on an interior side of a passenger compartment. In a conventional steel rear door, because it is difficult to achieve a structure by pressing that allows a secure attachment of an edge portion of an interior trim to an inner panel along a periphery portion of a rear window opening, and the edge portion of the interior trim is not secured to the periphery portion of the window opening. Thus, positional variations of the interior trim occurs along the edge portion of the interior trim, resulting in variations in positional relationship between the edge portion of the interior trim and a transparent portion of the rear window glass. This deteriorates appearance of the periphery portion of the rear window glass.

An object of the present disclosure is to improve appearance of a periphery portion of a rear window glass in a resin rear door of a vehicle.

SUMMARY

A vehicle rear door made of resin according to an embodiment of the present disclosure includes a resin inner panel having a rear window opening, a resin outer panel including an edge portion secured to the inner panel along a periphery portion of the rear window opening, a rear window glass attached to the edge portion of the outer panel on an exterior side of a passenger compartment, and an interior trim attached to the inner panel on an interior side of the passenger compartment. An edge portion of the interior trim is secured to the inner panel along the periphery portion of the rear window opening.

Such a secure attachment of the edge portion of the interior trim to the inner panel along the periphery portion of the rear window opening inhibits positional variation of the edge portion of the interior trim with respect to a transparent portion of the rear window glass, improving appearance of the periphery portion of the rear window glass.

In a vehicle rear door made of resin according to an embodiment of the present disclosure, the inner panel further includes a rib disposed along the periphery portion of the rear window opening and extending towards the interior side of the passenger compartment, and the interior trim includes two or more jaw portions regularly spaced at a predetermined pitch along the edge portion of the interior trim to sandwich the rib of the inner panel.

Such a regularly-spaced secure attachment of the edge portion of the interior trim at a predetermined pitch along the periphery portion of the rear window opening effectively inhibits positional variations of the edge portion of the interior trim with respect to a transparent portion of the rear window glass, improving appearance of the periphery portion of the rear window glass.

A vehicle rear door made of resin according to the present disclosure can improve appearance of a periphery portion of a rear window glass.

BRIEF DESCRIPTION OF DRAWINGS

Embodiment(s) of the present disclosure will be described based on the following figures, wherein.

DESCRIPTION OF EMBODIMENTS

Figure 1:
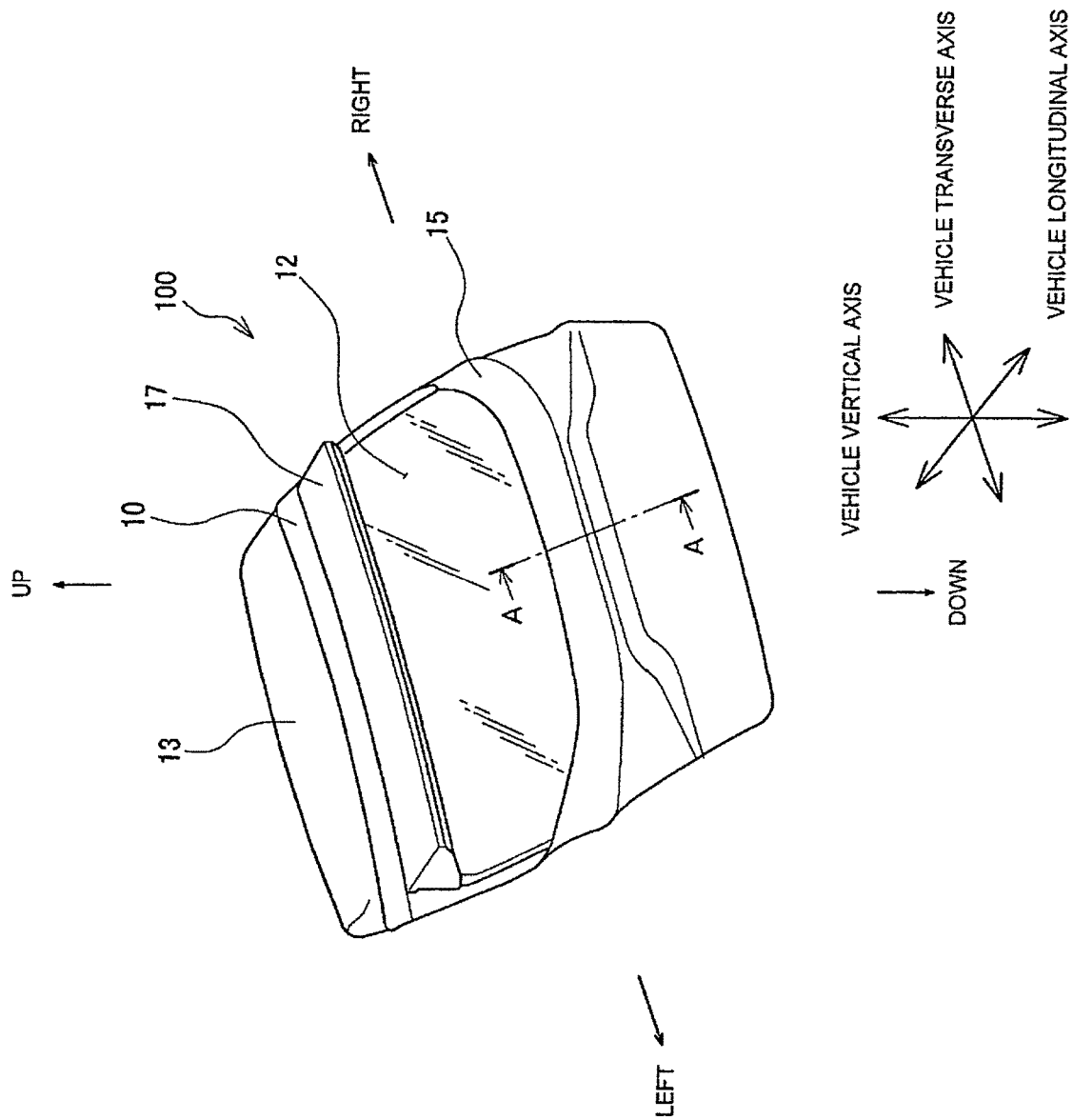
FIG. 1 is a perspective view of a resin rear door according to an embodiment of the present disclosure.

A resin rear door 100 of a vehicle according to an embodiment of the present disclosure is described below with reference to the attached drawings. As shown in FIG. 1, the resin rear door 100 is a flip up door which is pivotably attached to a roof panel 13 at a rear portion of a vehicle body via a pair of hinges near the right and left ends of the upper portion of the resin rear door 100. The resin rear door 100 opens and closes a door opening formed at the rear end of the vehicle body by being pivoted up and down about the hinges. The resin rear door 100 includes a resin upper outer panel 10 and a lower outer panel 15 (both shown in FIG. 1) and a resin inner panel 20 and a metal reinforcing member 40 secured to the inner panel 20 (both shown in FIG. 2). The reinforcing member 40 includes a left reinforcing member 41L, a right reinforcing member 41R, a bottom reinforcing member 47, a left corner attaching member 46L, and a right corner attaching member 46R. A rear window 12 is disposed in the middle.

Figure 2:
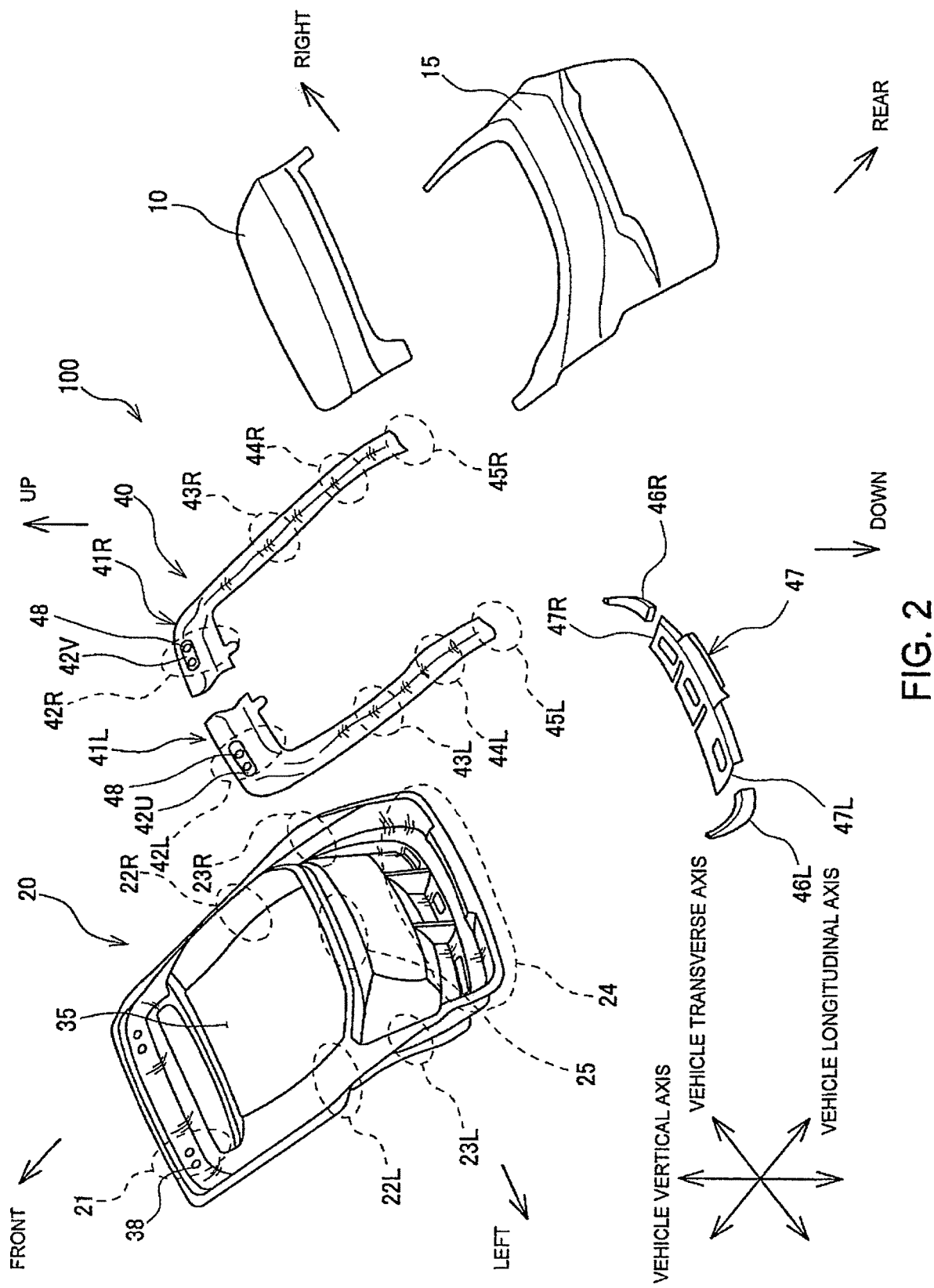
FIG. 2 is an exploded perspective view of the resin rear door shown in FIG. 1.

As shown in FIG. 2, the inner panel 20 includes a rear window opening 35 formed in the middle, and an upper portion 21 disposed at an upper side of the rear window opening 35 such that the upper outer panel 10 is attached to the upper portion 21. The inner panel 20 also includes a window left frame portion 22L and a window right frame portion 22R both disposed on transversely outer sides of the rear window opening 35. The inner panel 20 further includes a window bottom frame portion 25 around the bottom center of the rear window opening 35 such that the lower outer panel 15 is attached to the window bottom frame portion 25. The inner panel 20 also includes a left lower portion 23L and a right lower portion 23R, to which the lower outer panel 15 is attached at the bottom side of the rear window opening 35 on transversely outer sides, and further includes a bottom portion 24. Bolt holes 38 to secure hinges are formed in the upper portion 21 of the inner panel 20 near the right and left ends.

The left reinforcing member 41L has a closed cross section and a substantial L-shape along the upper portion 21, the window left frame portion 22L, and the left lower portion 23L of the inner panel 20, whereas the right reinforcing member 41R has a closed cross section and a substantial L-shape along the upper portion 21, the window right frame portion 22R, and the right lower portion 23R of the inner panel 20. The left reinforcing member 41L includes a left upper shoulder 42L which is opposingly coupled to the upper portion 21 of the inner panel 20, and a left upper arm portion 43L and a left lower arm portion 44L which are opposingly coupled to the window left frame portion 22L and the left lower portion 23L of the inner panel 20 to extend along the vertical axis of the vehicle. A recess portion 42U is provided at an upper portion of the left upper shoulder 42L. The recess portion 42U includes one or more bolt holes 48 to secure a hinge.

The right reinforcing member 41R is a mirror image of the left reinforcing member 41L. The right reinforcing member 41R includes a right upper shoulder 42R, a right upper arm portion 43R, and a right lower arm portion 44R. A recess portion 42V including one or more bolt holes 48 is provided at an upper portion of the right upper shoulder 42R.

The left corner attaching member 46L is a substantially L-shaped member which connects a lower end portion 45L of the left reinforcing member 41L and a left end portion 47L of the bottom reinforcing member 47, whereas the right corner attaching member 46R is a substantially L-shaped member which connects a lower end portion 45R of the right reinforcing member 41R and a right end portion 47R of the bottom reinforcing member 47.

The resin rear door 100 is attached to the roof panel 13 with hinges secured near the right and left edges of the roof panel 13 by passing bolts through the bolt holes 38 of the inner panel 20 and the bolt holes 48 provided in the left reinforcing member 41L or the right reinforcing member 41R, and tightening nuts from the other side.

Figure 3:
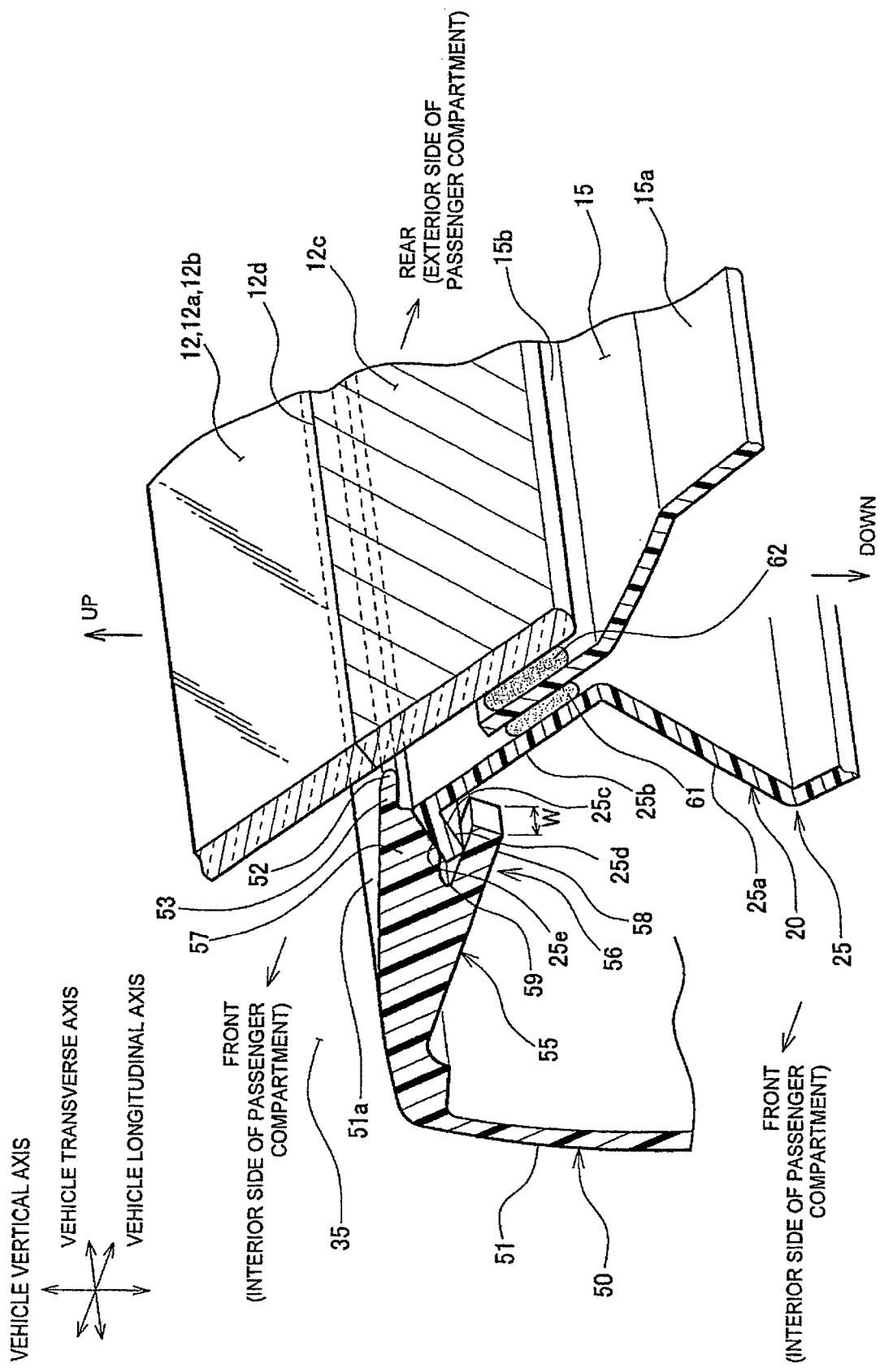
FIG. 3 is a cross sectional view taken along a line A-A in FIG. 1.

As shown in FIG. 3, the window bottom frame portion 25 of the inner panel 20 includes a body panel 25a which protrudes towards the inside of the passenger compartment (towards the front of the vehicle), and a flange 25b which extends from the upper edge of the body panel 25a towards the front of the vehicle. The flange 25b forms a lower periphery portion of the rear window opening 35. The window bottom frame portion 25 further includes a rib 25c which extends inside the passage compartment (obliquely downward towards the front of the vehicle) from the front edge of the flange 25b. An upper surface 25e of the rib 25c on the passenger compartment side forms an edge of the rear window opening 35. In other words, the rib 25c is a leading edge of the periphery portion of the rear window opening 35.

As shown in FIG. 3, the lower outer panel 15 includes a design surface 15a (a part of a vehicle exterior design) of an vehicle exterior surface and an edge portion 15b which is attached, with adhesive 61, to an exterior surface of the flange 25b of the inner panel 20 which forms a lower periphery portion of the rear window opening 35. A rear window glass 12a is attached, via urethane 62, to the edge portion 15b of the lower outer panel 15 on the exterior side. The rear window glass 12a includes a transparent portion 12b and an opaque portion 12c (for example, a black portion) as shown by hatching in FIG. 3.

An interior trim 50 is attached to the inner panel 20 on the interior side of the passenger compartment. The interior trim 50 includes an interior panel 51 which forms a design surface 51a (a part of the vehicle interior design) inside the passenger compartment. The interior trim 50 also includes an edge periphery 53 which includes an edge portion 52 extending from the interior panel 51 towards the interior surface of the rear window glass 12a. The interior trim 50 further includes jaw portions 56 provided between the edge periphery 53 and the interior panel 51. The edge portion 52 is provided along the transverse axis of the vehicle parallel to a boundary 12d between the transparent portion 12b and the opaque portion 12c of the rear window glass 12a.

Each of the jaw portions 56 includes an upper jaw portion 57 and a lower jaw portion 58. The upper jaw portion 57 and the lower jaw portion 58 bifurcate from a junction 59 to form a Y-shape. The upper jaw portion 57 and the lower jaw portion 58 secure the edge periphery 53 of the interior trim 50 to the rib 25c of the inner panel 20 at the front edge by sandwiching, between the top and the bottom, the upper surface 25e and a lower surface 25d of the rib 25c at the front edge of the inner panel 20 by elastic force.

As shown in FIG. 3, each jaw portion 56 has a width W along the transverse axis of the vehicle. The jaw portions 56 are regularly spaced at a predetermined pitch along the rib 25c. Thus, the edge periphery 53 of the interior trim 50 is attached to the rib 25c of the inner panel 20 at the predetermined pitch. The pitch between the regularly spaced attachments (for example, 50 to 100 mm) should be determined so that positional variations of the edge periphery 53 of the interior trim 50 with respect to the transparent portion 12b of the rear window glass 12a are inhibited.

As described above, the vehicle resin rear door 100 according to an exemplary embodiment of the present disclosure can improve appearance of the periphery portion of the rear window glass 12a by securing the edge periphery 53 of the interior trim 50 to the rib 25c which is the front edge of the inner panel 20 along the peripheral portion of the rear window opening 35 to inhibit positional variations of the edge periphery 53 of the interior trim 50 with respect to the transparent portion 12b of the rear window glass 12a.

The invention claimed is:

1. A vehicle rear door made of resin comprising:
   a resin inner panel comprising a rear window opening;
   a resin outer panel comprising an edge portion secured to the resin inner panel along a periphery portion of the rear window opening;
   a rear window glass attached to the edge portion of the resin outer panel on an exterior side of a passenger compartment; and
   an interior trim attached to the resin inner panel on an interior side of the passenger compartment, and
   wherein an edge portion of the interior trim is secured to the resin inner panel along the periphery portion of the rear window opening, and
   wherein the resin inner panel further comprises a rib disposed along the periphery portion of the rear window opening and extending towards the interior side of the passenger compartment.

2. The vehicle rear door made of resin according to claim 1, wherein
   the interior trim comprises a plurality of jaw portions regularly spaced at a predetermined pitch along the edge portion of the interior trim to sandwich the rib of the resin inner panel.

* * * * *